United States Patent [19]

Jackson et al.

[11] Patent Number: 5,051,858
[45] Date of Patent: Sep. 24, 1991

[54] RECORDING DISK HAVING IMPROVED CENTERING HUB AND MAGNETIC YOKE ARRANGEMENT

[75] Inventors: Robert S. Jackson, Saint Paul, Minn.; Toshio Aizawa, Miyagi, Japan

[73] Assignees: Minnesota Mining and Manufacturing Company, St. Paul, Minn.; Sony Corporation, Tokyo, Japan

[21] Appl. No.: 494,446

[22] Filed: Mar. 16, 1990

[51] Int. Cl.$^5$ .............................................. G11B 5/82
[52] U.S. Cl. ................................................... 360/135
[58] Field of Search ................................ 360/135, 133

[56] References Cited

U.S. PATENT DOCUMENTS

| | | | |
|---|---|---|---|
| 4,445,157 | 4/1984 | Takahashi | 360/133 |
| 4,459,628 | 7/1984 | Barton | 360/133 |
| 4,503,474 | 3/1985 | Nigam | 360/133 |
| 4,590,532 | 5/1986 | Saito | 360/133 |
| 4,698,715 | 10/1987 | Oishi | 360/133 |
| 4,788,615 | 11/1988 | Oishi | 360/135 |
| 4,797,764 | 1/1989 | Doering | 360/135 |
| 4,843,512 | 6/1989 | Moore et al. | 360/133 |

FOREIGN PATENT DOCUMENTS 3441521A 11/1984 Fed. Rep. of Germany .

Primary Examiner—Robert S. Tupper
Attorney, Agent, or Firm—Douglas B. Little; Gary L. Griswold; Walter N. Kirn

[57] ABSTRACT

Recording disk, such a a data recording disk, having:
1. annular main body having datum surface intended to rest on disk drive turntable;
2. hub having a center hole;
3. magnetic yoke, generally concentric with the main body and hub; said recording disk being characterized by:
   A. yoke plate adherend on one side of main body, being radially closer to the center hole than datum surface and adjacent the hub;
   B. axial spacing between yoke plate and hub; and
   C. axial spacing between datum surface and the side of the yoke plate away from the yoke plate adherend.

Design (keeping disk datum and yoke plate adherend on main body rather than on hub) maintains elasticity of the hub (not restricting it like designs in which yoke plate is glued to hub) giving good disk centering onto disk drive spindle. Preferably, hub is made of material having higher elasticity than main body, and both are integral, i.e., injection molded in intimate contact.

Stretched surface recording (SSR) disks can be made with this hub design.

4 Claims, 4 Drawing Sheets

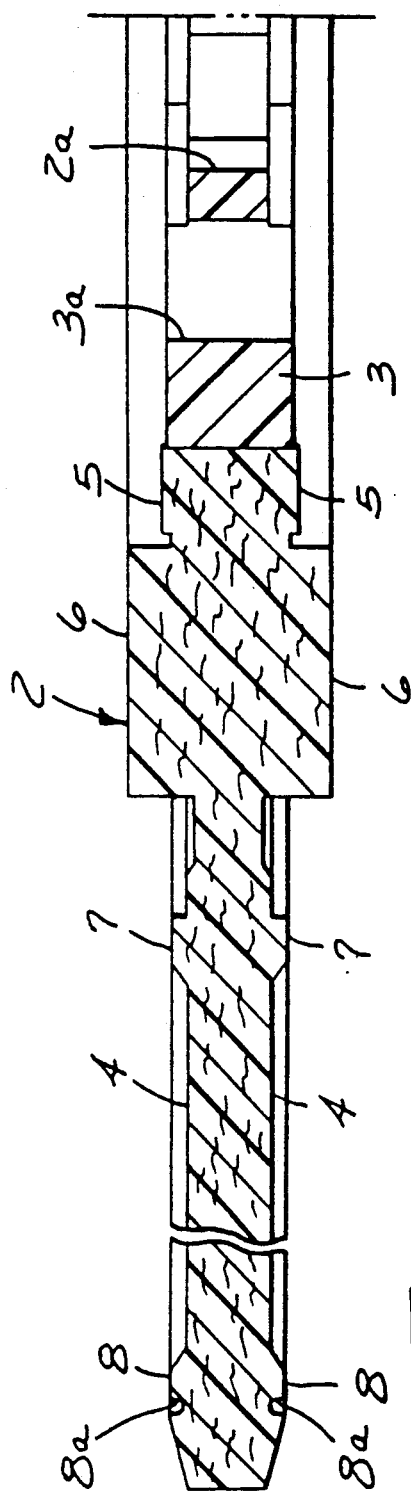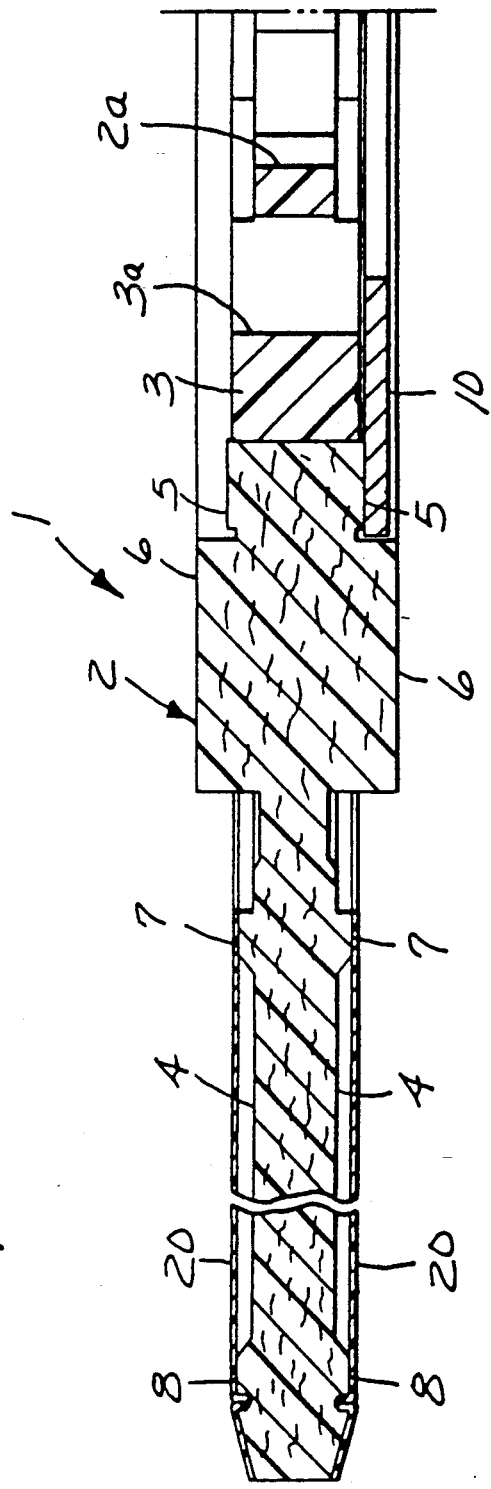

RECORDING DISK HAVING IMPROVED CENTERING HUB AND MAGNETIC YOKE ARRANGEMENT

TECHNICAL FIELD

This invention pertains to a recording reproduction disk formed by applying a magnetic sheet over both surfaces of the disk base with tension so that the disk can be used for recording and reproduction of information.

BACKGROUND

Recording reproduction disks formed by applying magnetic sheet on both surfaces of the disk base have been known. In FIGS. 5-7, item 22 is a disk body comprised of a synthetic resin and glass filler the center of which has center hub receiving hole 22a, and annular recessed portions 22b were formed on both surfaces.

In order to accomplish the centering onto spindle 31 projected on turntable 30 in the disk drive for the disk main body 22, center hub 23 is attached to the inner circumference of one surface of the disk by adhesives or ultrasonic welding. The center hub has flange 24 on the outer circumference of one surface, and the center hole 25 is located at the middle. One surface 24a of flange 24 on the center hub 23 (the upper surface in FIG. 6) forms the disk datum placed on the before mentioned turntable 30, and the bottom surface 25a around the center hole 25 at the inner circumference of the flange 24 (the upper surface in FIG. 6) forms yoke plate application surface for yoke plate 10 to be held by the force of magnet 32 on the turntable. The yoke plate is made of a metal such as steel in a disc-form, and has tongue 11 on its outer circumference, and is attached to the outer side of yoke plate application surface 25a of the before mentioned center hub.

Magnetic sheet 20 is attached at or near the outer and inner diameters of the before mentioned disk main body 22. The recording reproduction disk 21 is comprised of disk main body 22, center hub 23, yoke plate 10, and a pair of magnetic sheets 20.

In known disks, disk datum 24a and yoke plate application surface 25a are formed on the center hub 23 which is fitted onto center hub hole 22a on the disk main body 22 with adhesives. The number of parts and adhesion processes required increases the complexity of assembly resulting in higher manufacturing cost. In addition, it has been necessary to provide sufficient adhesion to withstand the disk drive chucking force since the disk main body 22, and center hub 23, which is attached by an adhesive, are to be placed onto a turntable in the disk drive.

DISCLOSURE OF INVENTION

One objective of this invention is to produce a recording reproduction disk with a high centering accuracy at a low cost. The invention can be summarized as a recording disk comprising an annular main body having a datum surface located closer to the center than the recording surface or data band; a hub located at the center of the main body and having a center hole; and a magnetic yoke plate, on which recording disk:

A. there is a yoke plate adherend to which the yoke plate is attached, located on one side of the main body radially closer to the center of the recording disk than the datum surface and adjacent to the hub;

B. there is an axial spacing between the yoke plate and the hub.

C. the datum surface on said one side of the main body is spaced axially further from the cross section center line of the recording disk than both the yoke plate adherend and the surface of the yoke plate which faces away from the yoke plate adherend.

The inventive recording reproduction disk is constructed by attaching a yoke plate to at least one surface (adherend) at the inner circumference of the center hole of the main body. The yoke plate is to be placed on the turntable side of a disk drive as the center hole is fitted onto the spindle of the disk drive. The disk has a solid hub, which positions the center hole against the spindle. The area around the center hole of the before mentioned disk is preferably made of a material having higher elasticity than the disk main body.

The following terms are used in this description:

data band or recording surface—the area on a recording disk useful for recording information by the disk drive, such as magnetic flux changes.

axial or axially—pertaining to distance or position along a line parallel to the recording disk axis.

radially—pertaining to distance or position measured along a radius of the recording disk.

cross section center line of the recording disk—line perpendicular to the axis of the disk which bisects its cross section into two equal halves.

integrally formed—forming plastic parts so close together that they become integral parts of a combined article (e.g., the combined main body and hub of this invention) without requiring any joining means such as an adhesive.

BRIEF DESCRIPTION OF DRAWINGS

FIG. 2 is a cross-section view of FIG. 1, at section line 2—2;

FIG. 4 is a cross-sectional view of FIG. 3, at section line 4—4;

In FIGS. 1-4, certain of the parts are identified as follows: 1 . . . Recording reproduction disk, 2 . . . Disk main body, 2a . . . Center hole, 3 . . . hub, 5 . . . Yoke plate adherend, 6 . . . Disk datum, 10 . . . Yoke plate, 30 . . . Turntable, 31 . . . Spindle.

DETAILED DESCRIPTION

The disk main body is constructed so that it can be freely rotated at high speed by attaching a yoke plate at the inner circumference of the disk main body on at least one surface of the disk, fitting the center hole of the disk onto the spindle of the disk drive, and engaging the before mentioned yoke plate with the magnetic chuck of the turntable of a disk drive. The hub, which is comprised of a material with a higher elasticity than that of the material comprising the disk, is formed within the center hole of the disk main body in a solid-form. Other features of the inventive recording disk are a yoke plate adhesion surface or adherend (to place the yoke plate at a position apart from the hub but near the hub on at least one surface of the disk body) and a disk datum to be placed on the before mentioned turntable.

The center hole of the disk main body and the center of the hub register well, since the hub, is formed within the center hole of the disk main body from a material having higher elasticity than that of the material comprising the disk main body; thus the centering accuracy is high. Also, the yoke plate adherend surface and the disk datum are each formed on at least one surface of the disk main body apart from the hub but near the hub. Therefore, surface deflection is minimized during rotation, and recording and reproduction are stabilized.

Figure 1:
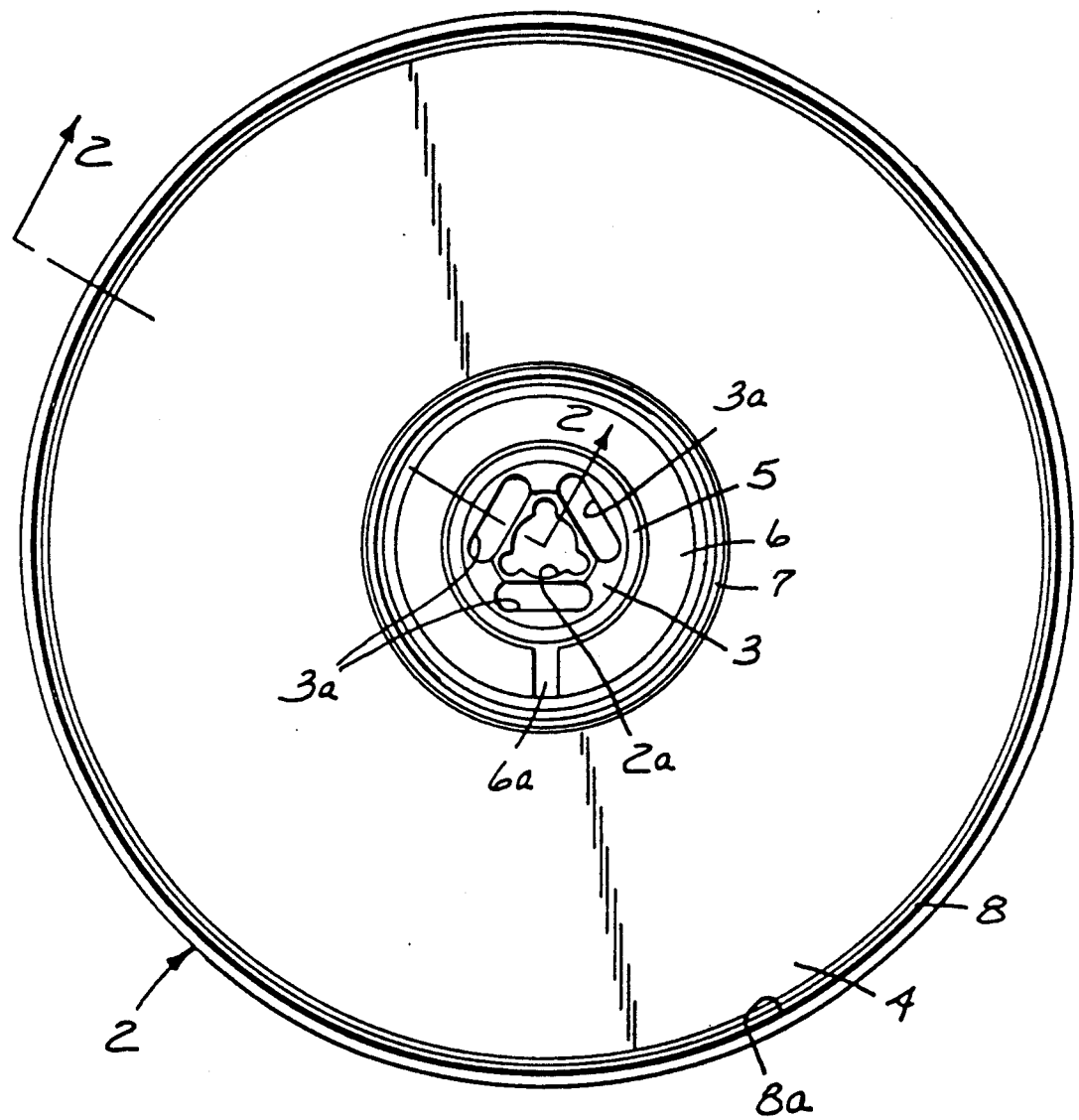
FIG. 1 shows an example of a top view of the disk main body of this invention.
Figure 3:
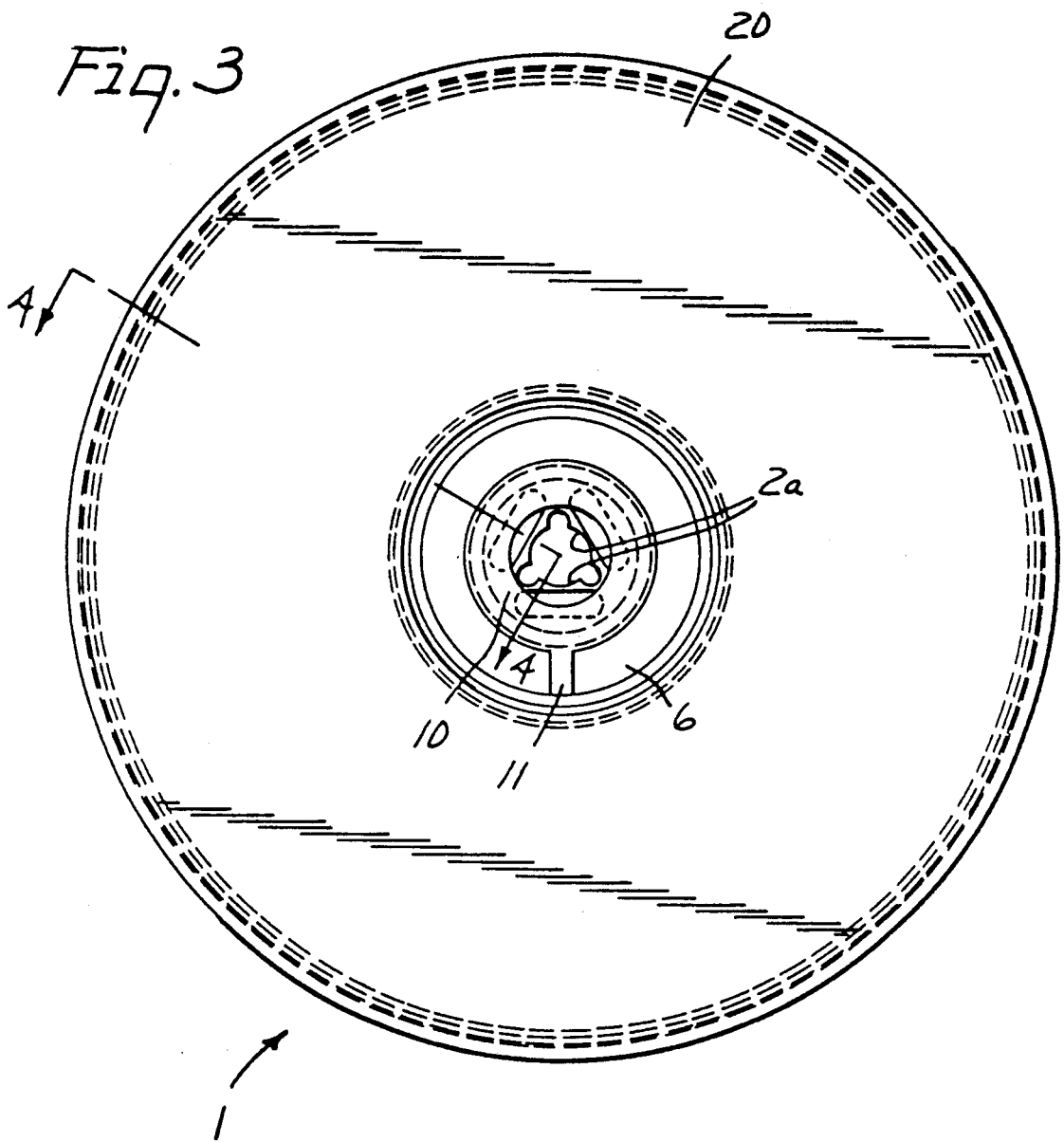
FIG. 3 is a top view of an assembled disk of this invention.
Figure 7:
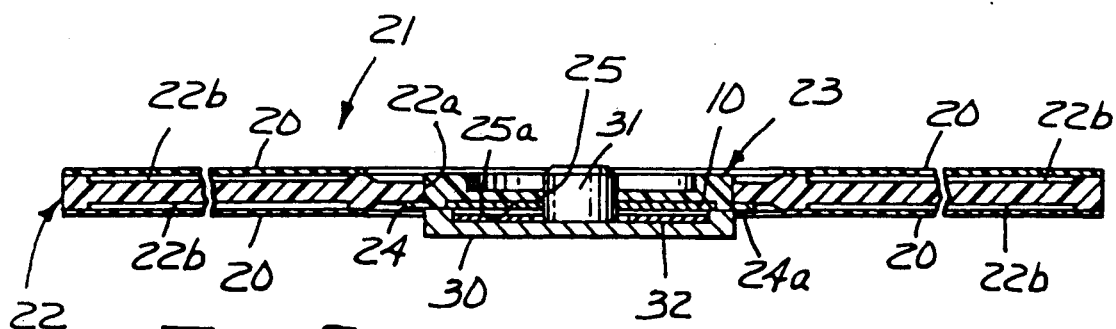
FIG. 7 is a cross-sectional view of an assembled known recording disk.
Figure 5:
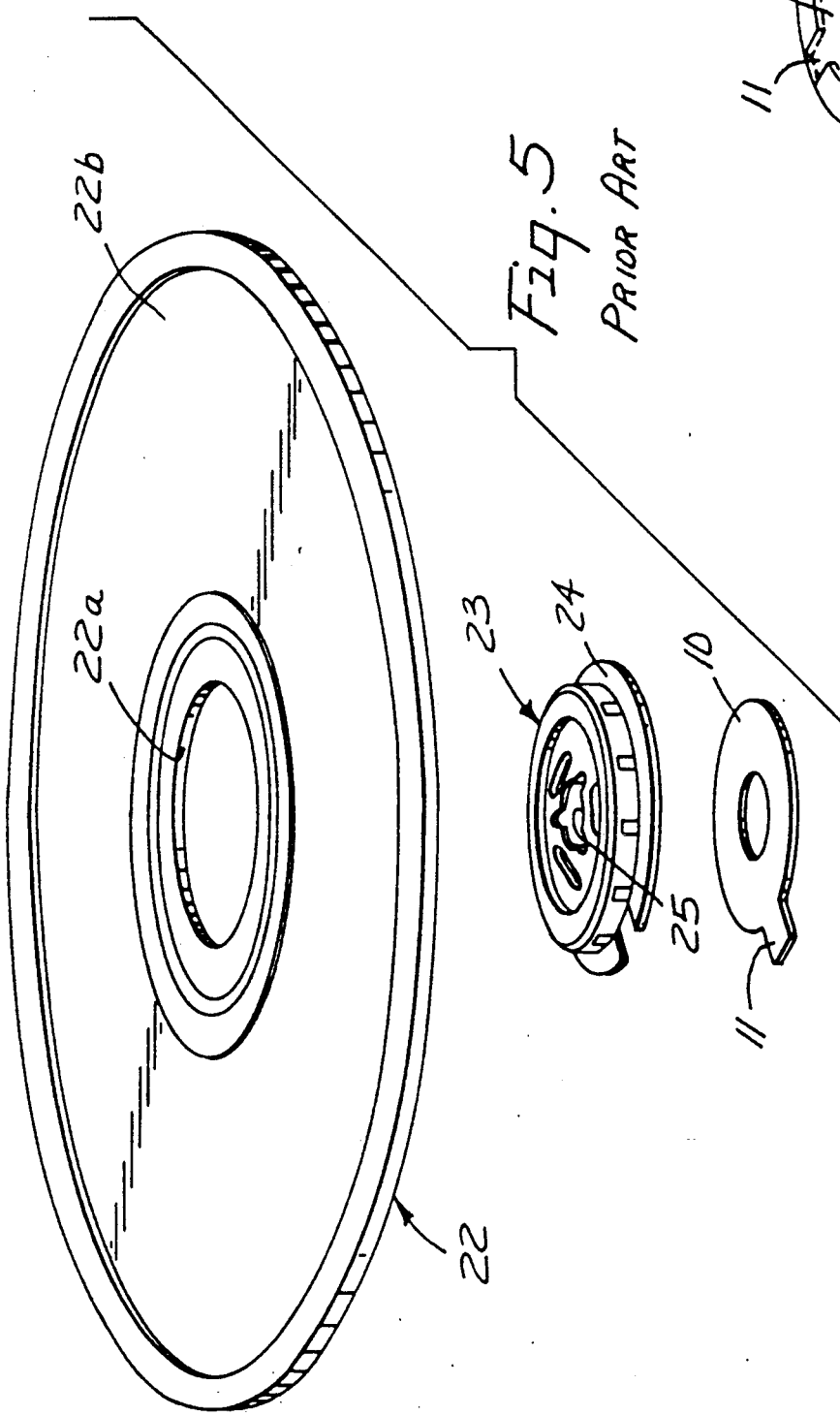
FIG. 5 is an oblique view of a previously known disk design.
Figure 6:
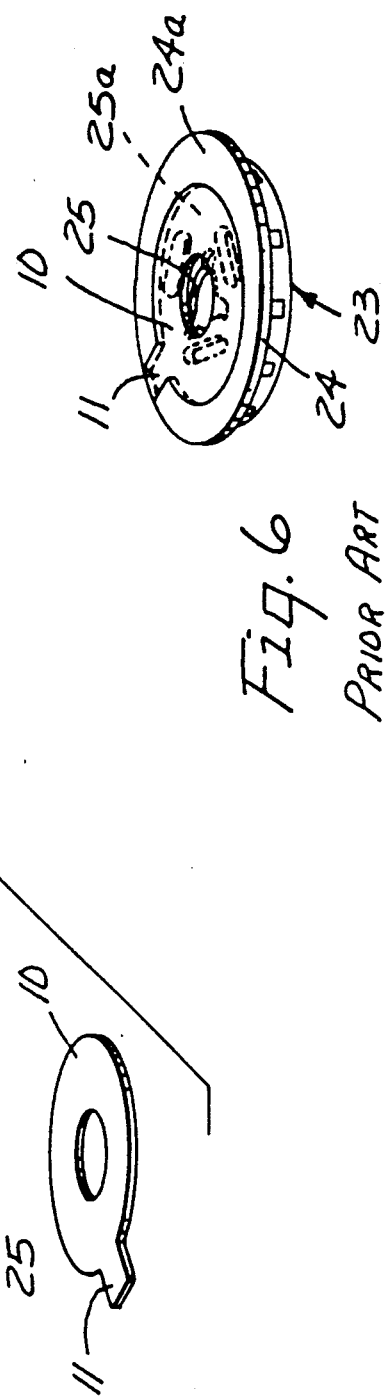
FIG. 6 is an oblique view of a previously known center hub.

The inventive design is explained in detail with reference to the drawings. In FIG. 3 and 4, 1 is the recording reproduction disk, and comprises disk main body 2 with a center hole 2a fitted onto spindle 31 in the disk drive; disc-form yoke plate 10 applied onto one surface of the disk near the disk center hole 2a with an adhesive; and flexible magnetic sheet 20 which is applied onto the both sides of the disk main body with tension.

Hub 3, which is to be fitted onto spindle 31 is formed around center hole 2a and in the center of the disk main body 2. It is preferably integrally formed with a material with a higher elasticity than that of disk main body 2. In other words, hub 3 is injection molded from materials such as polyimide or polyetherimide prior to forming disk main body 2, and then the disk main body excluding the hub is injection molded, in intimate contact with the hub, from polyimide or polyetherimide containing a specific amount of glass filler. The hub contains three slots 3a, 3a, and 3a surrounding center hole.

Circular grooves or recesses 4 can be formed (e.g., in the molding) on both surfaces of the before mentioned disk main body, as well as yoke plate adherend 5 (to contact yoke plate 10 at a position apart from the hub but near the hub), and disk datum surface 6 (to be placed on the before mentioned turntable 32). The yoke plate adherend and the disk datum surface are integrally formed on at least one surface of the disk at a position apart from the hub but near the hub. The yoke plate adherend 5 spaced axially slightly further from the cross section center line of the disk main body than the surface of hub 3, and disk datum surface 6 is spaced axially outward from the yoke plate adherend. On both surfaces of disk main body, magnetic sheet application areas 7 and 8 are formed, so that the annular magnetic sheet 20 can be applied to the main body with tension and stretched across the recesses 4. A circular groove 8a is formed application area 8. Magnetic sheet 20 is applied with tension by pressing the sheet against the application areas 7 and 8 so that recesses 4 formed on both surfaces of the disk main body are covered by the magnetic sheet 20.

The before mentioned yoke plate 10 is the conventional type, positioning being accomplished by fitting tab or tongue 11 into notch 6a formed on the disk datum surface 6 and applying the yoke plate on one adherend surface 5 of the disk main body 2 with an adhesive. As shown in FIG. 4, yoke plate 10 is not attached or contacted to hub 3, and the inner diameter of the yoke plate 10 is greater than the diameter of center hole 2a.

As mentioned above, for the inventive recording reproduction disk 1, hub 3 and the disk main body 2 have a strong bond, since the hub is formed integrally around the center hole of the disk. Compared to previously known disks, in which the hub is attached by adhesives, the reliability is high, and parts can be eliminated and the center hub application process can also be eliminated, resulting in fewer assembly steps and cost reduction.

Also, hub 3 is formed integrally with a material having higher elasticity than disk main body 2. Therefore, center hole 2a of the disk can be accurately fitted onto spindle 31 when the disk 1 is inserted onto turntable 30 in the disk drive since the hub is made of a flexible material. The centering accuracy for the spindle 31 is significantly improved since the center of the center hole 2a, and the center of hub 3 coincide.

Furthermore, axial run out between disk datum 6 and magnetic sheet 20 is small when the disk 1 is rotated on the turntable since yoke adherend 5 and disk datum 6 are each formed integrally on the disk, stabilizing headload, and eliminating disk deflection. As a result, recording and reproduction can be accomplished stably.

Yoke plate adherend 5 is located slightly higher (further from the cross section center line) than the surface of hub 3. When the yoke plate 10 contacts yoke adherend surface 5, the yoke plate does not come in contact with hub 3. Therefore, elasticity (spring) of the hub is not disturbed, making it possible to be accurately fitted onto spindle 31.

In this description a recording disk with flexible magnetic disk attached (stretched surface recording disk) was used; however, the invention can also be applied to recording reproduction disks such as rigid magnetic disks, optical disks and high density magneto-optic disks. By means of this design the centering of the recording reproduction disk on the spindle in the disk drive can be accomplished accurately at low cost.

What is claimed is:

1. A recording disk comprising an annular main body having a datum surface located closer to the center than the recording surface; a hub located at the center of the main body and having a center hole; and a magnetic yoke plate, on which recording disk:

A. there is a yoke plate adherend to which the yoke plate is attached, located on one side of the main body radially closer to the center of the recording disk than the datum surface and adjacent to the hub;

B. there is an axial spacing between the yoke plate and the hub; and

C. the datum surface on said one side of the main body is spaced axially further from the cross section center line of the recording disk than the surface of the yoke plate which faces away from the yoke plate adherend.

2. The recording disk of claim 1 in which the material of the hub has higher elasticity than the material of the disk main body.

3. The recording disk of claim 2 wherein the hub is integrally formed with the disk main body by molding the hub and main body in intimate contact with each other.

4. The recording disk of claim 2 wherein the disk main body has recessed portion between its inside and outside diameters and which further comprises an annular recording medium disk attached to the main body and stretched across said recessed portion under tension.

* * * * *

UNITED STATES PATENT AND TRADEMARK OFFICE
CERTIFICATE OF CORRECTION

PATENT NO. : 5,051,858

DATED : September 24, 1991

INVENTOR(S) : Robert S. Jackson et al.

It is certified that error appears in the above-identified patent and that said Letters Patent is hereby corrected as shown below:

Page 6, column 3, line 50

-- add the words "on the outer" after the word "formed" --

Signed and Sealed this

Tenth Day of August, 1993

Attest:

MICHAEL K. KIRK

*Attesting Officer*  Acting Commissioner of Patents and Trademarks